US010533101B2

(12) United States Patent
Lee et al.

(10) Patent No.: US 10,533,101 B2
(45) Date of Patent: Jan. 14, 2020

(54) INORGANIC COATING SOLUTION COMPOSITION AND METHOD OF FORMING INORGANIC COATING FILM USING THE SAME

(71) Applicant: GP&E AMERICA, INC., San Jose, CA (US)

(72) Inventors: Dong Gyu Lee, Daejeon (KR); Il Hoon Cho, Daejeon (KR); Young Yeol Yang, Daejeon (KR)

(73) Assignee: GP&E America, Inc., San Jose, CA (US)

( * ) Notice: Subject to any disclaimer, the term of this patent is extended or adjusted under 35 U.S.C. 154(b) by 0 days.

(21) Appl. No.: 16/150,909

(22) Filed: Oct. 3, 2018

(65) Prior Publication Data

US 2019/0031894 A1    Jan. 31, 2019

Related U.S. Application Data

(62) Division of application No. 15/201,174, filed on Jul. 1, 2016, now Pat. No. 10,125,273.

(30) Foreign Application Priority Data

Nov. 4, 2015   (KR) .................. 10-2015-0154592

(51) Int. Cl.
   *C09D 7/43*    (2018.01)
   *C09D 1/04*    (2006.01)
   *C23C 22/62*   (2006.01)
   *C23C 18/12*   (2006.01)
   *C09D 7/40*    (2018.01)
   *C08K 3/32*    (2006.01)
   *C23C 18/04*   (2006.01)

(52) U.S. Cl.
   CPC .............. *C09D 7/43* (2018.01); *C09D 1/04* (2013.01); *C09D 7/40* (2018.01); *C23C 18/122* (2013.01); *C23C 18/1212* (2013.01); *C23C 18/1283* (2013.01); *C23C 22/62* (2013.01); *C08K 2003/329* (2013.01); *C23C 18/04* (2013.01)

(58) Field of Classification Search
   None
   See application file for complete search history.

(56) References Cited

U.S. PATENT DOCUMENTS

2006/0113506 A1*   6/2006  Man ................. A01N 37/16
                                                   252/186.1
2015/0291821 A1   10/2015  Elliot et al.

* cited by examiner

*Primary Examiner* — Nathan T Leong
(74) *Attorney, Agent, or Firm* — Drinker Biddle & Reath LLP (57) ABSTRACT

An inorganic coating solution composition including an alkali metal silicate, a curing agent, a dispersant, a defoamer, and a solvent, wherein the curing agent is phosphoric acid ($H_2PO_4$), the dispersant is at least one selected from among Tween 20, Tween 40, Tween 60, Tween 80, polyvinyl pyrrolidone, polyethylene glycol 400 and polyvinyl alcohol, and the defoamer is at least one selected from among a silicone-based defoamer, an alcohol-based defoamer, a mineral oil-based defoamer and a powder defoamer.

6 Claims, 8 Drawing Sheets

Fig. 1

Fig. 2A
SEM surface image
(before SUS coating)

Fig. 2B
SEM surface image
(after SUS coating)

Fig. 3B
Contact angle: 10.3°
(after coating)

Fig. 3A
Contact angle: 30°
(before coating)

| Test Item | Unit | Sample Classification | Result | Test Method |
|---|---|---|---|---|
| After liquid resistance (5% NaOH, 24h, immersion) whether delamination or swelling occurred | - | - | No occurrence | KS M ISO 2812-1:2012, method suggested by client |
| After liquid resistance (5% acetic acid, 24 h) whether delamination or swelling occurred | - | - | No occurrence | KS M ISO 2812-1:2012, method suggested by client |
| After liquid resistance (5% sulfuric acid, 24 h) whether delamination or swelling occurred | - | - | No occurrence | KS M ISO 2812-1:2012, method suggested by client |
| Boiling water resistance (3h) | - | - | - | KS D 8303 : 2009 |
| Outer appearance (whether delamination or swelling occurred) | - | - | No occurrence | Method suggested by client |
| Adhesion | - | - | No loss | KS D 6711 : 2012 |

Test Report

Report No.: CTI3-79597

Attachment

Test Item: Antibacterial Activity Test Method

Test Method: Film Adhesion Method (TI-10-007): JIS Z 2801: JIS Z 2801 Standard

A test sample (an antibacterial hydrophilic coating agent) is aseptically placed in a sterile Petri dish, 0.4 ml of a test inoculum is inoculated on the center of the surface of the test sample, a coating film is closely attached to the top thereof, the Petri dish is covered with a lid, and culture is performed at a temperature of (35±1) °C and a relative humidity of 90% or more for 24 hr.

As a control group (a non-coated test sample), 0.4 ml of a test inoculum is inoculated on the center of the bottom of a sterile Petri dish, a film is closely attached to the top thereof, the Petri dish is covered with a lid, and culture is performed at a temperature of (35±1) °C and a relative humidity of 90% or more for 24 hr.

The following viable cell numbers are measured.

(A) Viable cell number of control group immediately after inoculation (B) Viable cell number of control group 24 hr after culture (C) Viable cell number of test sample 24 hr after culture Antibacterial activity is represented by a percentage based on the following equation.

* Antibacterial activity (%) = $\dfrac{(B) - (C)}{(B)} \times 100$

Test Result:

| Strain: | Classification | Viable cell number (CFU/ml) | Antibacterial activity (%) |
|---|---|---|---|
| Escherichia coli (ATCC 8739) | (A) | $1.8 \times 10^3$ | |
| | (B) | $2.6 \times 10^7$ | 99.9 |
| | (C) | < 10 | |

INORGANIC COATING SOLUTION COMPOSITION AND METHOD OF FORMING INORGANIC COATING FILM USING THE SAME

CROSS REFERENCE TO RELATED APPLICATIONS

The present application is a divisional of U.S. patent application Ser. No. 15/201,174, filed Jul. 1, 2016, which claims priority to Korean Patent Application No. 10-2015-0154592, filed Nov. 4, 2015. The contents of these applications are incorporated herein by reference in their entirety.

FIELD

Disclosed herein are an inorganic coating solution composition and a method of forming an inorganic coating film using the same.

BACKGROUND

Typical paint, which is an inorganic coating solution, has been widely used in not only a variety of industrial applications, including those of railways, vehicles, ships, road infrastructure, and electronic and electric products, but also general homes such as kitchens and living rooms.

However, organic paint containing an organic solvent may cause environmental pollution due to the use of the organic solvent such as an alcohol and the like. Moreover, in the case where a surface painted therewith is polluted with an organic material (e.g. oil, a spray-type lacquer, an oily pen such as a magic pen, etc.), the surface of the organic paint is hydrophobic and thus efficiently coupled with the organic material, making it difficult to remove the pollutant using water.

Organic paint has low tackiness and adhesion to the surface of metal and nonferrous metal, so in order to coat the surface of metal and nonferrous metal, the surface is subjected to sanding treatment or acid treatment or requires additional pretreatment such as coating with an additional material having high adhesion, undesirably complicating the coating process and increasing processing costs. Furthermore, the coating material may be delaminated from the base substrate upon long-term use or external impact.

Also, the organic paint is poorly resistant to high temperatures and may be easily burned, and thus, the demand for paint and a coating agent capable of replacing such organic paint is ongoing.

SUMMARY

Keeping in mind the problems encountered in the related art, the present disclosure provides an inorganic coating solution composition, which may reduce environmental pollution and facilitates the removal of the pollutants, and a method of forming an inorganic coating film using the same.

In addition, the present disclosure provides an inorganic coating solution composition, which does not cause environmental pollution after drying and firing, and a method of forming an inorganic coating film using the same.

The present disclosure also provides an inorganic coating solution composition, which may exhibit superior weather resistance, durability, wear resistance, surface hardness, corrosion resistance, and chemical resistance, and a method of forming an inorganic coating film using the same.

The present disclosure also provides an inorganic coating solution composition which may exhibit superior antibacterial effects and a method of forming an inorganic coating film using the same.

An embodiment of the present disclosure provides an inorganic coating solution composition, comprising: an alkali metal silicate, a curing agent, a dispersant, a defoamer, and a solvent, wherein the curing agent is phosphoric acid ($H_3PO_4$), the dispersant is at least one selected from among Tween 20, Tween 40, Tween 60, Tween 80, polyvinyl pyrrolidone, polyethylene glycol 400, and polyvinyl alcohol, and the defoamer is at least one selected from among a silicone-based defoamer, an alcohol-based defoamer, a mineral oil-based defoamer, and a powder defoamer.

The inorganic coating solution composition may include, based on the total weight of the inorganic coating solution composition, 9 to 64 parts by weight of the alkali metal silicate, 0.1 to 1 parts by weight of the curing agent, 0.01 to 5 parts by weight of the dispersant, 0.001 to 0.1 parts by weight of the defoamer, and 30 to 90 parts by weight of the solvent.

The solvent may be a hydrophilic solvent or G-sol (Ag-$TiO_2$).

As such, G-sol may include, based on 100 parts by weight of the inorganic coating solution composition, 0.0000005 to 10 parts by weight of a silver colloid, 0.0000001 to 15 parts by weight of titanium dioxide, 0.000001 to 6 parts by weight of a dispersion stabilizer, and 69 to 99 parts by weight of water.

The inorganic coating solution composition may further include a pH controller for preventing precipitation, and a thickener, wherein the pH controller is at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine, and the thickener is at least one selected from among polyacrylic acid and carboxymethyl cellulose.

The inorganic coating solution composition may include, based on the total weight of the inorganic coating solution composition, 9 to 64 parts by weight of the alkali metal silicate, 0.1 to 1 parts by weight of the curing agent, 0.01 to 2 parts by weight of the pH controller, 0.01 to 5 parts by weight of the dispersant, 0.01 to 0.2 parts by weight of the thickener, 0.001 to 0.1 parts by weight of the defoamer, and 30 to 90 parts by weight of the solvent.

The solvent may be a hydrophilic solvent.

The inorganic coating solution composition may further include a pH controller, a thickener, and an inorganic filler, wherein the pH controller is at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine, the thickener is at least one selected from among polyacrylic acid and carboxymethyl cellulose, and the inorganic filler is at least one selected from among titanium dioxide ($TiO_2$), zeolite, silica, and alumina.

The inorganic coating solution composition may include, based on the total weight of the inorganic coating solution composition, 9 to 64 parts by weight of the alkali metal silicate, 0.1 to 1 parts by weight of the curing agent, 0.01 to 2 parts by weight of the pH controller, 0.01 to 5 parts by weight of the dispersant, 0.01 to 0.2 parts by weight of the thickener, 0.001 to 0.1 parts by weight of the defoamer, 30 to 90 parts by weight of the solvent, and 0.01 to 2 parts by weight of the inorganic filler.

The solvent is preferably a hydrophilic solvent.

The inorganic coating solution composition may have a pH of 8 to 14.

Another embodiment provides a method of forming an inorganic coating film, comprising: preparing an inorganic coating solution composition by mixing an alkali metal silicate, phosphoric acid ($H_3PO_4$), at least one dispersant selected from among Tween 20, Tween 40, Tween 60, Tween 80, polyvinyl pyrrolidone, polyethylene glycol 400 and polyvinyl alcohol, at least one defoamer selected from among a silicone-based defoamer, an alcohol-based defoamer, a mineral oil-based defoamer and a powder defoamer, and a solvent; thermally treating a base substrate at a first predetermined temperature; coating the surface of the base substrate, which is thermally treated, with the inorganic coating solution composition; and firing the base substrate coated with the inorganic coating solution composition at a second predetermined temperature for a predetermined time.

The solvent may be water or G-sol.

Also, preparing the inorganic coating solution composition may be performed by preparing the inorganic coating solution composition via further addition of a pH controller and a thickener, the pH controller may be at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine, and the thickener may be at least one selected from among polyacrylic acid and carboxymethyl cellulose.

Also, preparing the inorganic coating solution composition may be performed by preparing the inorganic coating solution composition via further addition of a pH controller for preventing precipitation, a thickener, and an inorganic filler, the pH controller may be at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine, the thickener may be at least one selected from among polyacrylic acid and carboxymethyl cellulose, and the inorganic filler may be at least one selected from among titanium dioxide ($TiO_2$), zeolite, silica, and alumina.

The method may further include at least one of treating the surface of the base substrate and washing the surface of the base substrate, before thermally treating the base substrate.

The method may further include drying the base substrate coated with the inorganic coating solution composition at a temperature equal to or higher than room temperature for a predetermined time, before firing the base substrate.

According to exemplary embodiments of the present disclosure, an inorganic coating film, which is formed using an inorganic coating solution composition, can be strongly bonded to a base substrate, particularly metal and non-metal surfaces, regardless of the kind of base substrate, thereby exhibiting high tackiness and adhesion to the base substrate, so that the coating film is not separated from the base substrate even after a long period of time.

Also, the inorganic coating film is a superhydrophilic coating film, and thus, even when water is allowed to flow on the surface of the coating film, the pollutants can be easily removed.

Also, the inorganic coating film can exhibit superior weather resistance, durability, chemical resistance, wear resistance, surface hardness, and corrosion resistance. When G-sol is used as the solvent, the resultant coating film can manifest antibacterial effects due to the antibacterial activity of G-sol.

When a hydrophilic solvent is used as the solvent, no pollutants are generated during the preparation of the composition or the coating process, and thus the coating film is environmentally friendly and has a semi-permanent lifetime. Furthermore, bacterial proliferation and biofouling, such as the formation of scum on the stored water, can be reduced.

BRIEF DESCRIPTION OF THE DRAWINGS

The above and other features and advantages of the embodiments disclosed herein will be more clearly understood from the following detailed description taken in conjunction with the accompanying drawings, in which.

DETAILED DESCRIPTION

Hereinafter, embodiments of the present disclosure will be described in detail with reference to the accompanying drawings so as to be easily performed by those skilled in the art. It should be appreciated that the embodiments may be implemented in various different forms, and are not limited to the embodiments described herein. In the accompanying drawings, portions unrelated to the description are omitted in order to clearly illustrate the embodiments.

With reference to the drawings, an inorganic coating solution composition and a method of forming a coating film using the same according to embodiments of the present disclosure are described below.

The inorganic coating solution composition according to an embodiment is described first.

The inorganic coating solution composition according to the present embodiment includes an alkali metal silicate, a curing agent, at least one dispersant, at least one defoamer, and a solvent.

In the present embodiment, the alkali metal silicate may be a liquid material, that is, sodium silicate and a potassium silicate hydrate. The curing agent may include phosphoric acid ($H_3PO_4$).

The curing agent functions to decrease the contact angle between water and a coating film so as to further enhance hydrophilic properties when the coating film is formed by coating the surface of a base substrate with the inorganic coating solution composition. Here, phosphoric acid is contained in an amount of 0.1 to 1 parts by weight in the inorganic coating solution composition.

When the amount of phosphoric acid falls in the above range, the hydrophilic properties may remain stable, and thus the contact angle between the water and the coating film is maintained at a predetermined angle or more.

The dispersant may be at least one selected from among Tween 20, Tween 40, Tween 60, Tween 80, polyvinyl pyrrolidone, polyethylene glycol 400, and polyvinyl alcohol.

The dispersant enables metal silicate particles to be uniformly dispersed in an aqueous phase so as to form a coating film to a predetermined thickness.

The dispersant may be contained in an amount of 0.01 to 5 parts by weight based on the total weight of the inorganic coating solution composition.

The defoamer is used to suppress foaming when the coating solution is shaken due to the presence of the dispersant.

When the defoamer is used in this way, foaming due to the use of the dispersant is eliminated. Thus, in the case where a spray-type coating product is manufactured using the inorganic coating solution composition, the clogging of a spray nozzle may be reduced in the spraying process and the formation of a coating film having a uniform thickness through spraying becomes possible.

In the present embodiment, the defoamer may be contained in an amount of 0.001 to 0.1 parts by weight based on the total weight of the inorganic coating solution composition, and may include at least one of a silicone-based defoamer, an alcohol-based defoamer, a mineral oil-based defoamer, and a powder defoamer.

The solvent used to mix the components for the composition may include water ($H_2O$) or G-sol ($Ag.TiO_2$).

When water, which is hydrophilic, is used, it may be contained in an amount of 30 to 90 parts by weight based on the total weight of the inorganic coating solution composition, and such a hydrophilic solvent additionally plays a role in increasing the dispersibility of the alkali metal silicate and the reaction efficiency.

When G-sol is used as the solvent, it may be contained in an amount of 30 to 90 parts by weight based on the total weight of the inorganic coating solution composition.

As such, G-sol may include, based on 100 parts by weight of the composition, 0.0000005 to 10 parts by weight of a silver colloid, 0.0000001 to 15 parts by weight of titanium dioxide, 0.000001 to 6 parts by weight of a dispersion stabilizer, and 69 to 99 parts by weight of water.

The pH of the inorganic coating solution composition, comprising the alkali metal silicate, the curing agent, the dispersant, the defoamer and the solvent, falls in the range from 8 to 14, so as to exhibit the stable reaction efficiency and maintain the solution stable.

Below is a description of the method of forming the inorganic coating film using the inorganic coating solution composition, with reference to FIG. 1.

The alkali metal silicate, the curing agent, the dispersant, the defoamer and the solvent are added in predetermined amounts into a stirrer and synthesized, thus preparing an inorganic coating solution composition (S10).

The curing agent is phosphoric acid ($H_3PO_4$), the dispersant may be at least one selected from among Tween 20, Tween 40, Tween 60, Tween 80, polyvinyl pyrrolidone, polyethylene glycol 400, and polyvinyl alcohol, and the defoamer may be at least one selected from among a silicone-based defoamer, an alcohol-based defoamer, a mineral oil-based defoamer, and a powder defoamer. The solvent may include water or G-sol.

When G-sol is used as the solvent, the reaction temperature should be set to an appropriate level, for example, 50 to 90° C., so that the inorganic material contained in G-sol and the alkali metal silicate are efficiently synthesized in the amount ranges.

When the reaction temperature is 50° C. or higher, the composition is stably synthesized. When the reaction temperature is 90° C. or lower, the synthesis performance is stably and uniformly maintained.

The stirring rate of the stirrer is 150 to 400 RPM. When the stirring rate is 150 RPM or more, the components are sufficiently mixed, and when the stirring rate is 400 RPM or less, stable stirring performance is ensured.

After preparation of the inorganic coating solution composition (S10), the base substrate, which is to be coated with the inorganic coating solution composition, is preheated at a predetermined temperature (S20).

The temperature for heating the base substrate is set to about 50±10° C.

By virtue of thermal treatment of the base substrate, the surface of the base substrate may be efficiently coated with the inorganic coating solution composition.

The base substrate is made of various materials, such as metal and nonferrous metal, plastics, ceramics for use in pottery, sinks, bathtubs or toilets, stone, tile, etc., and any base substrate that needs to be coated with paint may be used.

In an alternative embodiment, in order to perform hydrophilic treatment of the base substrate before thermal treatment (S20), surface treatment of the base substrate and surface washing of the base substrate may be further carried out.

The surface treatment of the base substrate may be implemented using any one selected from among plasma treatment, anodizing, sanding treatment, etching, and degreasing for removing impurities from the surface of the base substrate.

When surface treatment of the base substrate and surface washing of the base substrate are further performed in this way, the hydrophilic properties of the surface of the base substrate are increased, thus enabling more efficient formation of the inorganic coating film.

The surface washing of the base substrate may be performed using an ultrasonic washing process.

The ultrasonic washing process is conducted in a manner such that the base substrate is immersed in an ultrasonic tank containing a water-soluble detergent and ultrasonic waves are generated, whereby the surface of the base substrate is thoroughly washed.

For ultrasonic washing, a water-soluble detergent containing an inorganic salt may be used. When a water-soluble detergent containing an inorganic salt is used, the adhesion of the inorganic coating film, which is formed on the surface of the base substrate, to the surface of the base substrate is increased, and the hardness of the coating film may also be increased. Before the ultrasonic washing process, soaking and steam washing may be further performed to remove oil and impurities.

In order to remove various oil components such as synthetic mineral oil and the like from the surface of the base substrate, the soaking and the steam washing are conducted in a manner in which the base substrate is placed in a washing vessel and soaked in the solvent and thus washed, or in which the solvent is evaporated and steam is condensed and allowed to flow to the surface of the base substrate so as to remove oil or impurities from the surface of the base substrate by means of the flowing condensed water.

When the base substrate is washed using condensed steam, the base substrate, discharged from the washing vessel, is rapidly dried, and thus additional drying of the base substrate is obviated, thereby reducing the production time.

After thermal treatment of the base substrate (S20), the surface of the base substrate, which is thermally treated, is coated with the inorganic coating solution composition, thus forming an inorganic coating film (S30).

The formation of the coating film on the surface of the base substrate using the inorganic coating solution composition may be conducted using any one process selected from among known coating processes, for example, dipping, spray coating, roll coating, spin coating, bar coating, flow coating, curtain coating, knife coating, vacuum deposition, ion plating, and plasma deposition, whereby the surface of the base substrate may be coated with the inorganic coating solution composition.

As such, the thickness of the coating film, which is formed on the surface of the base substrate using the inorganic coating solution composition, may be 0.01 to 30 μm.

For example, when the surface of the base substrate is coated with the inorganic coating solution composition using a dipping process, the resulting coating film may have a thickness of 0.01 to 5 μm. When the surface of the base substrate is coated with the inorganic coating solution composition using a spray coating process, the resulting coating film may have a thickness of 0.1 to 10 μm.

In order to completely cure the applied inorganic coating solution composition after the formation of the coating film on the surface of the base substrate using the inorganic coating solution composition, the base substrate is dried at a temperature equal to or higher than room temperature for a predetermined time, and the dried base substrate is fired for a predetermined time, thus completing the inorganic coating film (S40).

The base substrate may be fired at 120 to 250° C. for 5 to 60 min. When the base substrate is fired under the above firing conditions, the coating film may be stably fired without causing thermal damage to the base substrate itself, whereby the hardness of the formed coating film may be increased and a smooth surface may result.

Specifically, the base substrate having the coating film formed thereon is placed in a firing furnace, and the temperature inside the firing furnace is gradually elevated.

A cooling process is performed to decrease the temperature of the base substrate to room temperature.

Upon forming the coating film, the temperature and time may be controlled depending on the amount of the solvent contained in the coating composition, thus increasing productivity and improving the quality of the coating film.

In the inorganic coating film formed on the base substrate, a phosphoric acid film, having strong adhesion, is formed between the base substrate and the coating film due to the use of phosphoric acid as the curing agent, and the OH monolayer film, which is hydrophilic, is formed on the surface of the coating film.

Below, the results of testing of the inorganic coating film formed using the inorganic coating solution composition according to the present embodiment are described.

As shown in Table 1 below, the corresponding components were mixed all at once in respective amounts in Preparation Examples 1 to 4 and stirred, thus preparing individual inorganic coating solution compositions for Examples 1 to 4.

TABLE 1

| Classification | Component | Prep. Ex. 1 | Prep. Ex. 2 | Prep. Ex. 3 | Prep. Ex. 4 |
|---|---|---|---|---|---|
| Composition | Alkali metal silicate | 9 | 12 | 15 | 17 |
| | Phosphoric acid ($H_3PO_4$) | 0.1 | 0.1 | 0.2 | 0.2 |
| | Dispersant | 4.0 | 3.0 | 2.0 | 1.0 |
| | Defoamer | 0.2 | 0.2 | 0.1 | 0.1 |
| | Water ($H_2O$) | 86.7 | 84.7 | 82.7 | 81.7 |
| Total | | 100 | 100 | 100 | 100 |

The inorganic coating solution composition of each of Preparation Examples 1 to 4 as shown in Table 1 was applied through a dipping process on a stainless steel substrate and then fired at 250° C. for 2 hr, thus completing individual stainless steel substrates coated with the inorganic coating films of Examples 1 to 4. The inorganic coating films of Examples 1 to 4 applied on the stainless steel substrates were tested as follows. The numerical results of individual test items are shown in Table 2 below.

TABLE 2

| Item | Ex. 1 | Ex. 2 | Ex. 3 | Ex. 4 |
|---|---|---|---|---|
| Pencil hardness | 9H | 9H | 9H | 9H |
| Adhesion | 4B | 5B | 5B | 5B |
| Cleaning | Poor | Poor | Good | Excellent |
| Contact angle | 31.0 | 23.0 (hydrophilic) | 12.2 (super-hydrophilic) | 10.3 (super-hydrophilic) |

In particular, the results of specific evaluation of Example 4 are illustrated in FIGS. 2A and 2B, 3A and 3B, and 4A to 4D.

As a Comparative Example, a stainless steel substrate not coated with the inorganic coating solution composition according to the present embodiment was prepared.

Specifically, the Comparative Example (a stainless steel substrate having no inorganic coating film) and Example 4 (a stainless steel substrate coated with the inorganic coating solution composition of Preparation Example 4) were measured for surface roughness, contact angle and cleaning performance. The results are shown in FIGS. 2A and 2B, 3A and 3B, and 4A to 4D.

Evaluation of roughness of the Comparative Example and Example 4

(1) Evaluation of Surface Roughness

Surface roughness was evaluated using an SEM (Scanning Electron Microscope), which is a device in which, while a focused e-beam is radiated on the surface of a sample, the surface of the sample is observed using secondary electrons or backscattered electrons generated through interactions between the e-beam and the sample.

Specifically, a specimen is thinly covered with heavy metal, and an e-beam is radiated on each point on the specimen using a piece of coil functioning as the lens of the SEM, whereby the specimen is scanned.

When an e-beam is radiated on consecutive points on the specimen, the amount of electrons that are diffused or backscattered is measured using a detector and thus an image is displayed on the video screen. An SEM has a resolution of about 3 to 20 nm and shows a three-dimensional image having high depth of focus.

The surfaces of the Comparative Example and the inorganic coating film of Example 4 were observed at 2,000× and 60,000× magnifications. The results are shown in FIGS. 2A and 2B.

Figure 2A:
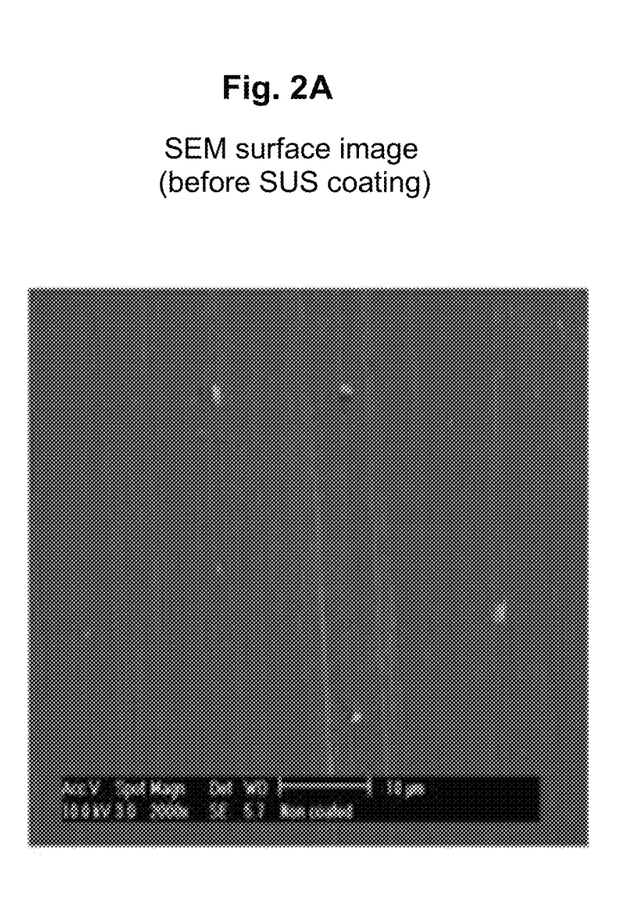
FIGS. 2A and 2B illustrate scanning electron microscope (SEM) images of the surface of a base substrate having an inorganic coating film formed using an inorganic coating solution composition according to an embodiment.
Figure 2B:
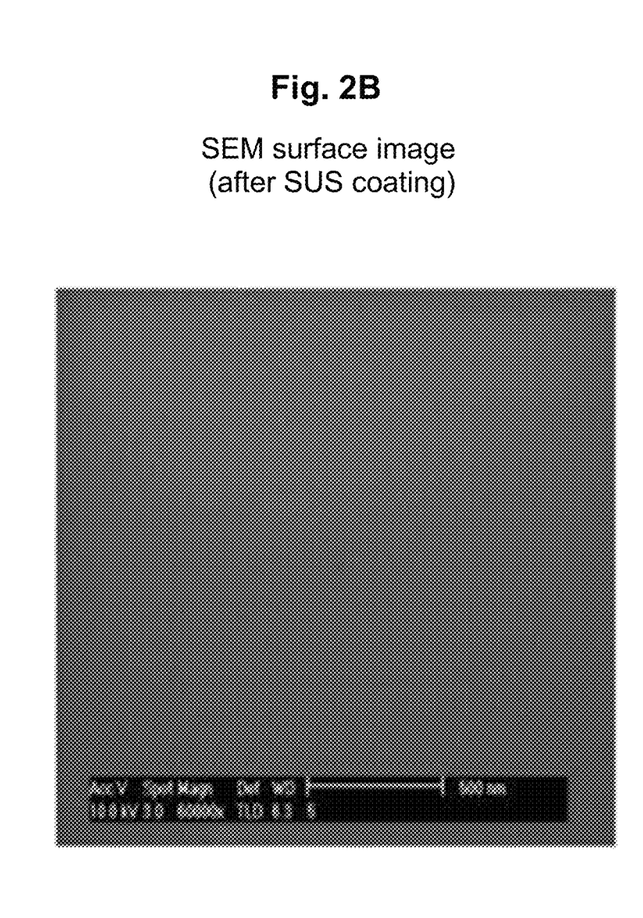

As illustrated in FIGS. 2A and 2B, the surface roughness of Example 4 was much finer than that of the Comparative Example.

(2) Evaluation of Contact Angle

Hydrophilicity was analyzed through measurement of a contact angle using a contact angle analyzer, according to ASTM D7334.

A single water drop was dropped on the inorganic coating film and changes in the morphology of the water on the inorganic coating film were observed. The contact angle was measured in order to determine the hydrophilicity of the inorganic coating film, the superhydrophilic properties increasing with a decrease in the contact angle. Cleaning performance is improved under the superhydrophilic condition.

Figure 3A:
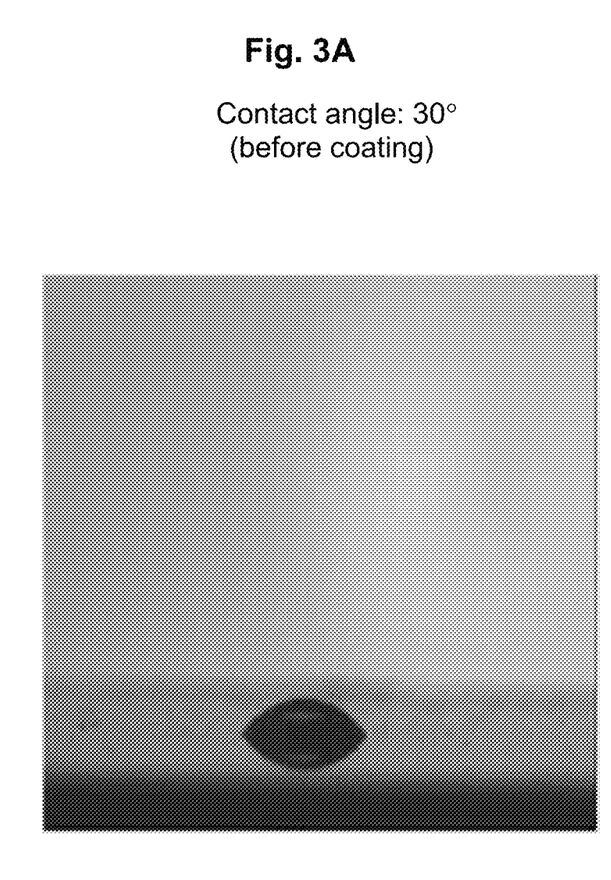
FIGS. 3A and 3B illustrate the results of measurement of the contact angle of the surface of the inorganic coating film according to an embodiment.
Figure 3B:
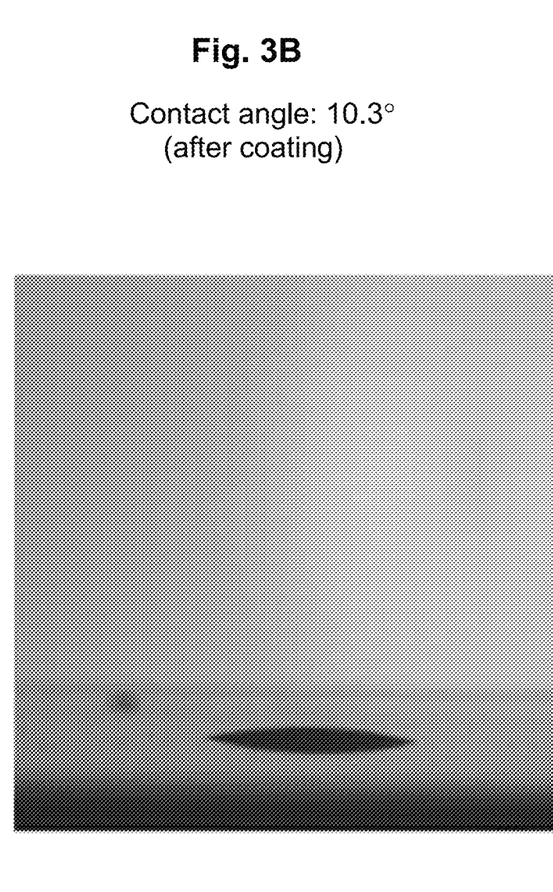

As shown in FIGS. 3A and 3B, the water drop on the stainless steel substrate of the Comparative Example having no inorganic coating film was measured to have a contact angle of 30° on the substrate, whereas the water drop on the stainless steel substrate of Example 4 having the inorganic coating film was measured to have a contact angle of 10.3°.

(3) Evaluation of Cleaning Performance

As illustrated in FIGS. 4A to 4D, an oily magic pen was applied to the surface of the stainless steel substrate of each of the Comparative Example and Example 4, and water (tap water) was sprayed thereon, after which the extent to which the magic ink was removed was measured.

Figure 4A:
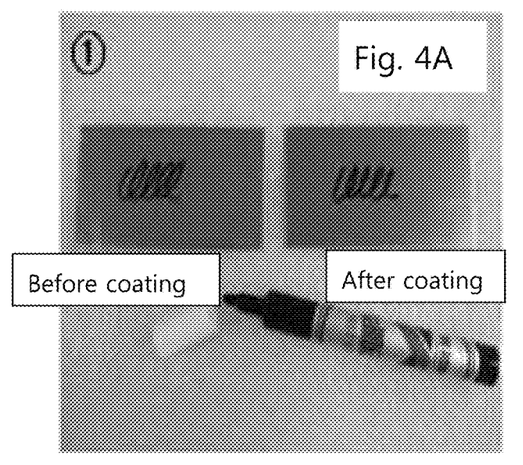
FIGS. 4A to 4D illustrate the results of testing of the cleaning performance of the surface of the base substrate having the inorganic coating film formed thereon according to an embodiment.
Figure 4B:
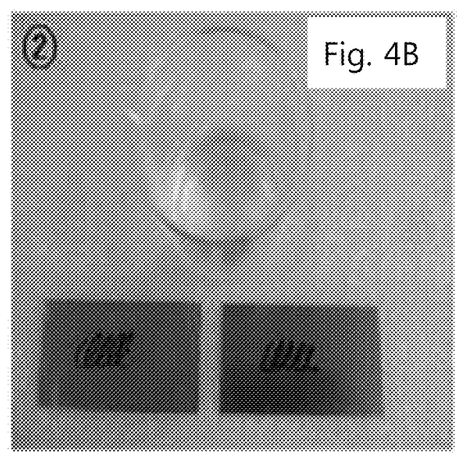
Figure 4C:
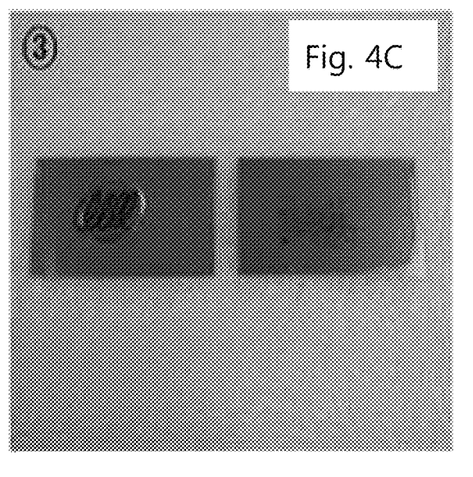
Figure 4D:
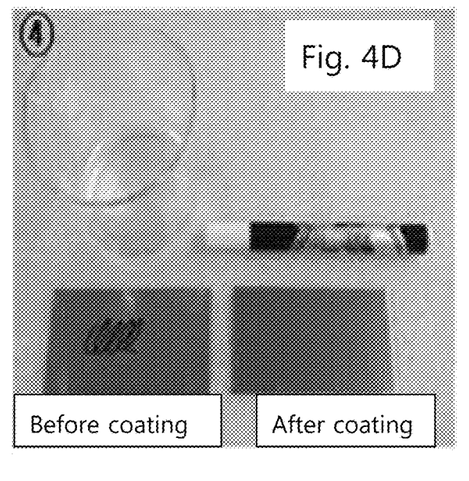

As illustrated in FIG. 4D, based on the results of the cleaning test, the magic ink applied on the stainless steel substrate of Example 4, having the inorganic coating film, was completely removed by tap water, but the magic ink applied on the stainless steel substrate of the Comparative Example, having no inorganic coating film, was not removed by tap water but was left behind.

(4) Evaluation of Pencil Hardness

The pencil hardness of the inorganic coating film of Example 4 was measured according to ASTM D3363. As such, a predetermined load (1 kg) was applied to the inorganic coating film using a measurement pencil.

The measurement results are represented by 9H to 1H, F, HB, and 1B to 6B, in which 9H is the highest hardness and 6B is the lowest hardness.

Figure 5:
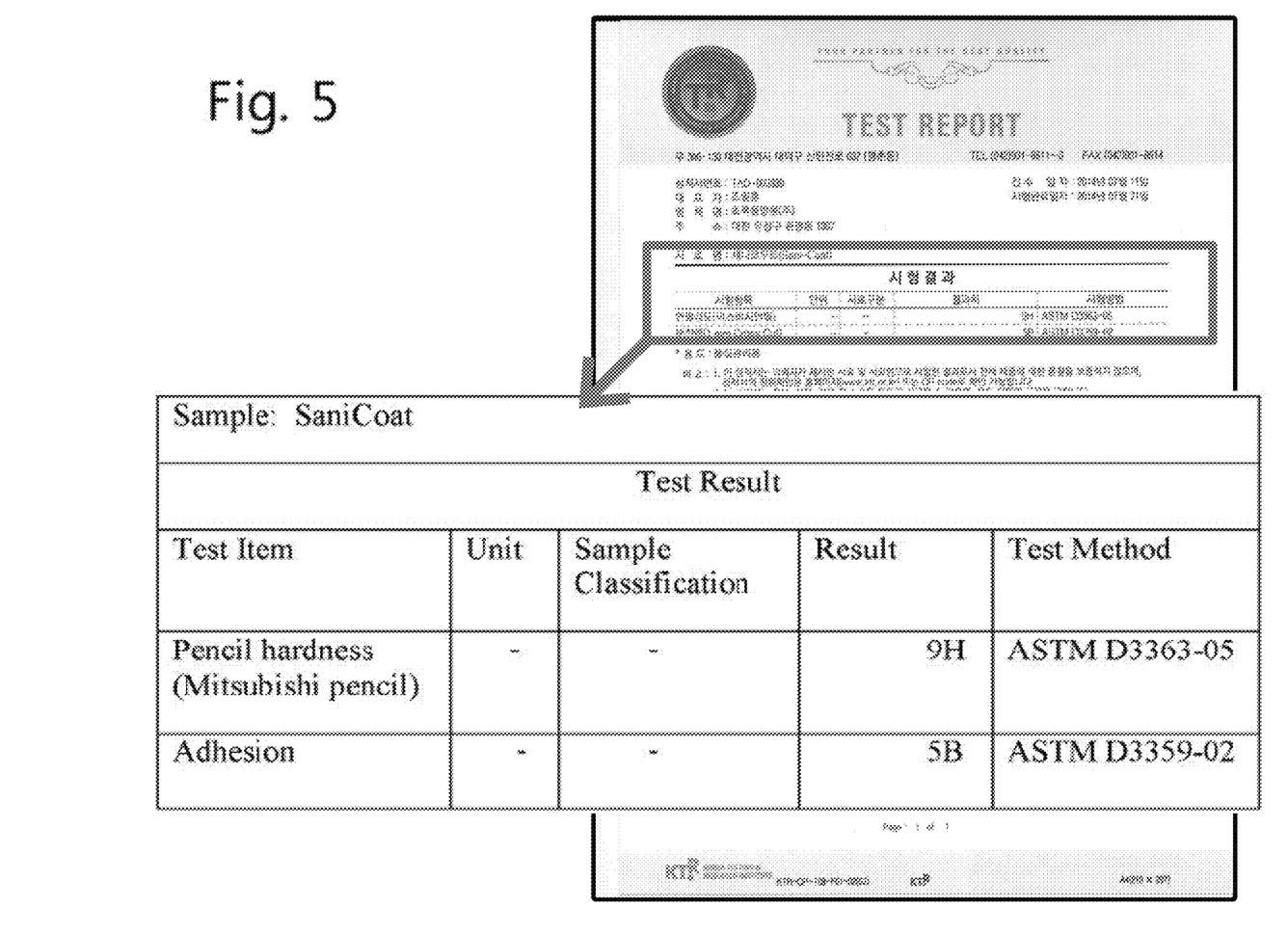
FIG. 5 illustrates the results of testing of the pencil hardness and adhesion of the surface of the base substrate having the inorganic coating film formed thereon according to an embodiment.

The results of evaluation of pencil hardness of Example 4 are shown in FIG. 5. With reference to FIG. 5, the inorganic coating film of Example 4 exhibited the highest hardness, specifically 9H.

(5) Evaluation of Adhesion

The adhesion of the inorganic coating film of Example 4 was measured according to ASTM D3359.

Adhesion was measured by scratching a checkerboard pattern on the inorganic coating film, completely attaching a piece of 3M tape, made by 3M, thereto, and then removing the piece of 3M tape with a predetermined force, whereby the extent of adhesion between the inorganic coating film and the substrate was measured.

The measurement results are represented by 0B to 5B, in which 0B is the lowest adhesion, where 65% or more of the coating film was lost, and 5B is the highest adhesion, without loss of the coating film.

The results of evaluation of adhesion of Example 4 are shown in FIG. 5. With reference to FIG. 5, the inorganic coating film of Example 4 exhibited the highest adhesion, specifically 5B.

(6) Evaluation of Corrosion Resistance

Figure 6:
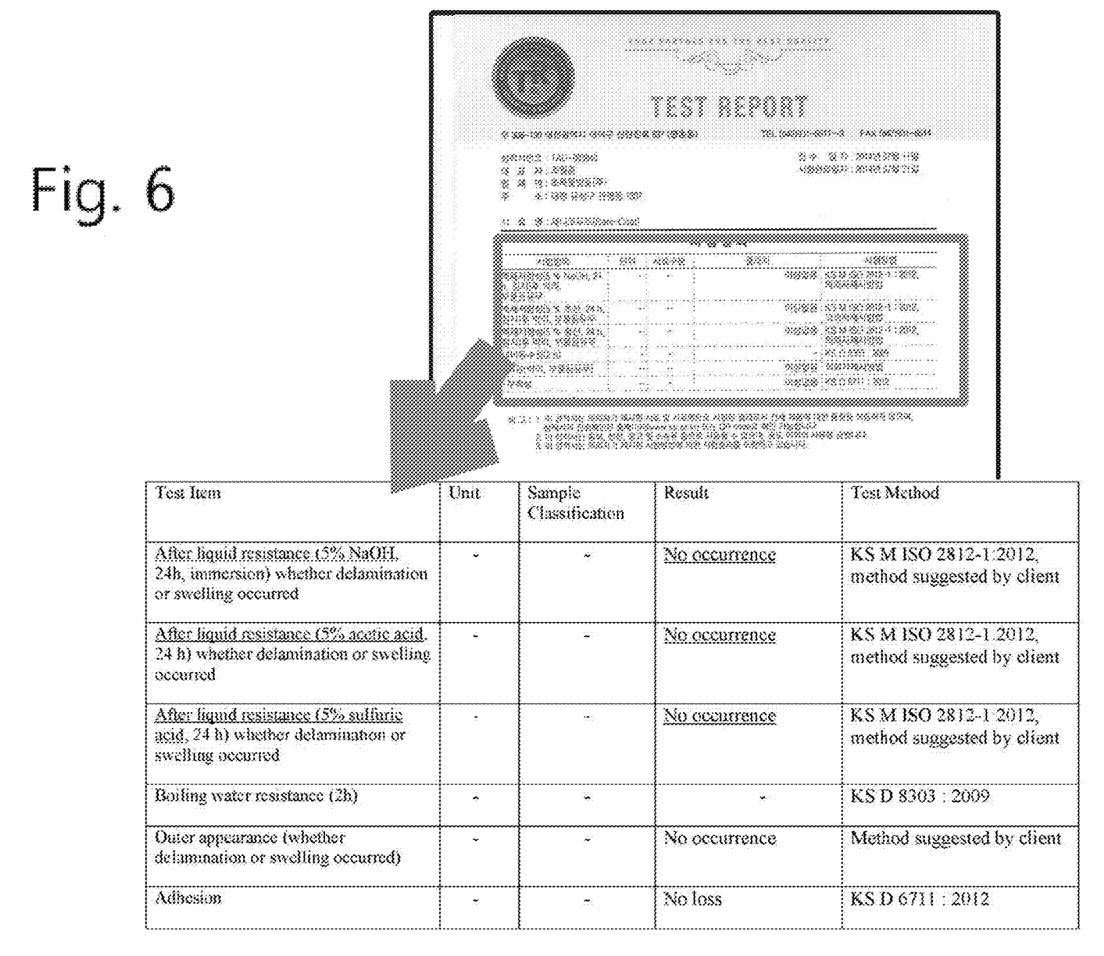
FIG. 6 illustrates the results of testing of the corrosion resistance of the surface of the base substrate having the inorganic coating film formed thereon according to an embodiment.

As illustrated in FIG. 6, the inorganic coating film of Example 4 was measured for corrosion resistance according to KS M ISO 2812.

As the test samples used for evaluation, a 5% sodium hydroxide aqueous solution, a 5% acetic acid aqueous solution and a 5% sulfuric acid aqueous solution were used. 24 hr after spraying respective test samples on the inorganic coating film, whether or not delamination of the coating film from the stainless steel substrate or swelling thereof occurred was measured. As illustrated in FIG. 6, the inorganic coating film of Example 4 was evaluated to be "No occurrence".

(7) Saline Immersion Test

A saline immersion test was performed in a manner in which a piece of fabric, the entire surface of which was coated with the inorganic coating film of Example 4, prepared using water as the solvent, and a piece of fabric, having no inorganic coating film, were immersed in a sodium chloride solution (sea water) and the reaction thereof was observed.

Figure 7A:
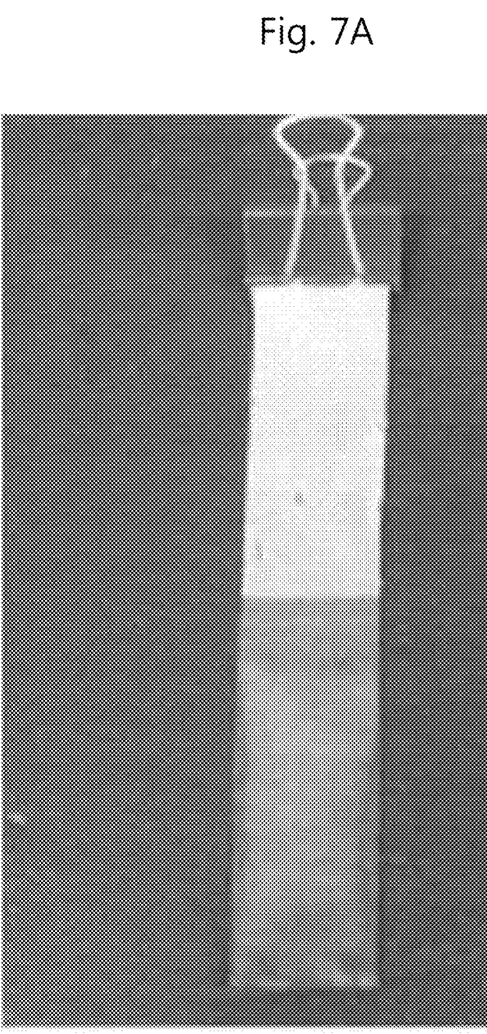
FIGS. 7A and 7B illustrate the results of saline immersion testing of a piece of fabric having the inorganic coating film formed thereon according to an embodiment.
Figure 7B:
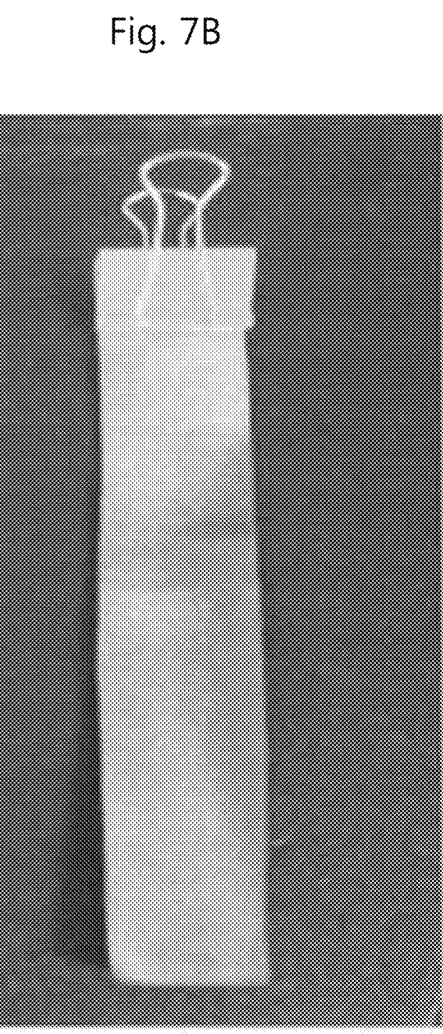

As illustrated in FIG. 7A, the piece of fabric, the entire surface of the which was covered with the inorganic coating film of Example 4, maintained its original state, but as illustrated in FIG. 7B, the piece of fabric that was not coated was corroded due to sodium chloride.

(8) Antibacterial Activity Test

The inorganic coating film of Example 4, prepared using G-sol as the solvent, was measured for antibacterial activity via a film adhesion method according to the JIS Z 2801 standard. The results are shown in FIG. 8.

Figure 8:
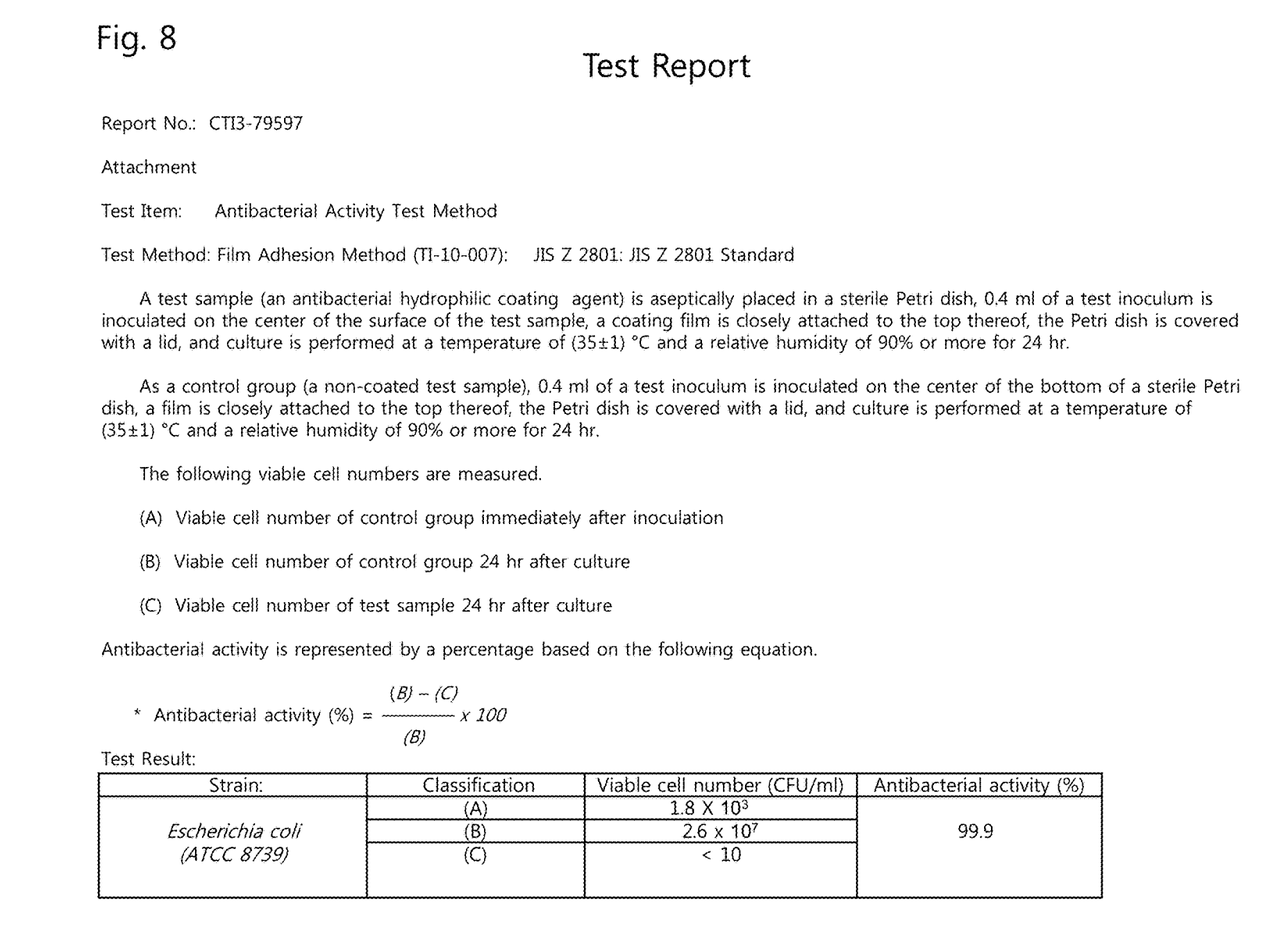
FIG. 8 illustrates the results of antibacterial testing of the surface of a sample having the inorganic coating film formed thereon according to an embodiment.

As illustrated in FIG. 8, the antibacterial activity of the product surface-treated with the inorganic coating film containing G-sol was measured to be 99.9%. Thereby, when surface treatment was performed using the inorganic coating film according to the present embodiment, antifouling performance and antibacterial performance were improved, and thus biofouling and bacterial proliferation were reduced.

In another embodiment of the present disclosure, the inorganic coating solution composition further includes a pH controller for preventing precipitation and a thickener.

Therefore, the inorganic coating solution composition according to the present embodiment further includes a pH controller and a thickener, in addition to the alkali metal silicate, the curing agent, at least one dispersant, at least one defoamer and the solvent. In the present embodiment, the solvent may be water, as the hydrophilic solvent, in lieu of G-sol.

The pH controller functions to adjust the pH of an aqueous phase to thus prevent precipitation and flocculation upon preparation of the inorganic coating solution composition.

The pH controller may be at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine.

The pH controller may be contained in an amount of 0.01 to 2 parts by weight based on the total weight of the inorganic coating solution composition.

The thickener is used to increase the viscosity of the coating surface of a hydrophobic medium which is not wet with water in order to enhance coatability.

The thickener may be at least one selected from among polyacrylic acid and carboxymethyl cellulose, and may be contained in an amount of 0.01 to 0.2 parts by weight based on the total weight of the inorganic coating solution composition.

As described above, the solvent, especially a hydrophilic solvent such as water, is used. As such, water, which is a hydrophilic solvent, may be contained in an amount of 30 to 90 parts by weight based on the total weight of the inorganic coating solution composition. Due to the water, acting as the solvent, dispersibility of the alkali metal silicate and reaction efficiency are improved as mentioned above.

In this way, the description of the alkali metal silicate, the curing agent, the dispersant, the defoamer and the solvent, but not the pH controller or the thickener, is the same as in the foregoing, and a detailed description thereof is omitted.

Preparation Examples 5 to 8 for preparing inorganic coating solution compositions for Examples 5 to 8 according to the present embodiment are shown in Table 3 below.

TABLE 3

| Classification | Component | Prep. Ex. 5 | Prep. Ex. 6 | Prep. Ex. 7 | Prep. Ex. 8 |
|---|---|---|---|---|---|
| Composition | Alkali metal silicate | 9 | 12 | 15 | 17 |
| | Phosphoric acid ($H_3PO_4$) | 0.1 | 0.1 | 0.2 | 0.2 |
| | pH controller | 0.1 | 0.1 | 0.2 | 0.2 |
| | Dispersant | 4.0 | 3.0 | 2.0 | 1.0 |
| | Thickener | 0.1 | 0.2 | 0.1 | 0.2 |
| | Defoamer | 0.2 | 0.2 | 0.1 | 0.1 |
| | Water ($H_2O$) | 86.5 | 84.4 | 82.4 | 81.3 |
| Total | | 100 | 100 | 100 | 100 |

The corresponding components were mixed all at once in respective amounts in Preparation Examples 5 to 8 and stirred, thus preparing individual inorganic coating solution compositions for Examples 5 to 8.

The inorganic coating solution composition of each of Preparation Examples 5 to 8 was applied through a dipping process on a stainless steel substrate and then fired at 250° C. for 2 hr, thus completing individual stainless steel substrates coated with inorganic coating films of Examples 5 to 8. The inorganic coating films of Examples 5 to 8 were measured for pencil hardness, adhesion, cleaning performance and contact angle. The results thereof are shown in Table 4 below.

TABLE 4

| Item | Ex. 5 | Ex. 6 | Ex. 7 | Ex. 8 |
|---|---|---|---|---|
| Pencil hardness | 9H | 9H | 9H | 9H |
| Adhesion | 4B | 5B | 5B | 5B |
| Cleaning | Poor | Poor | Good | Excellent |
| Contact angle | 31.0 | 23.0 (hydrophilic) | 12.2 (super-hydrophilic) | 10.3 (super-hydrophilic) |

The stainless steel substrate of the Comparative Example not coated with the inorganic coating solution composition according to the present embodiment and the stainless steel substrate of Example 8 coated with the inorganic coating film according to Preparation Example 8 were evaluated for roughness, contact angle, and cleaning performance in the same manner as in the description with reference to FIGS. 2A and 2B, 3A and 3B, and 4A to 4D, and a description of the evaluation of contact angle and cleaning performance is the same as that given above.

Figure 1:
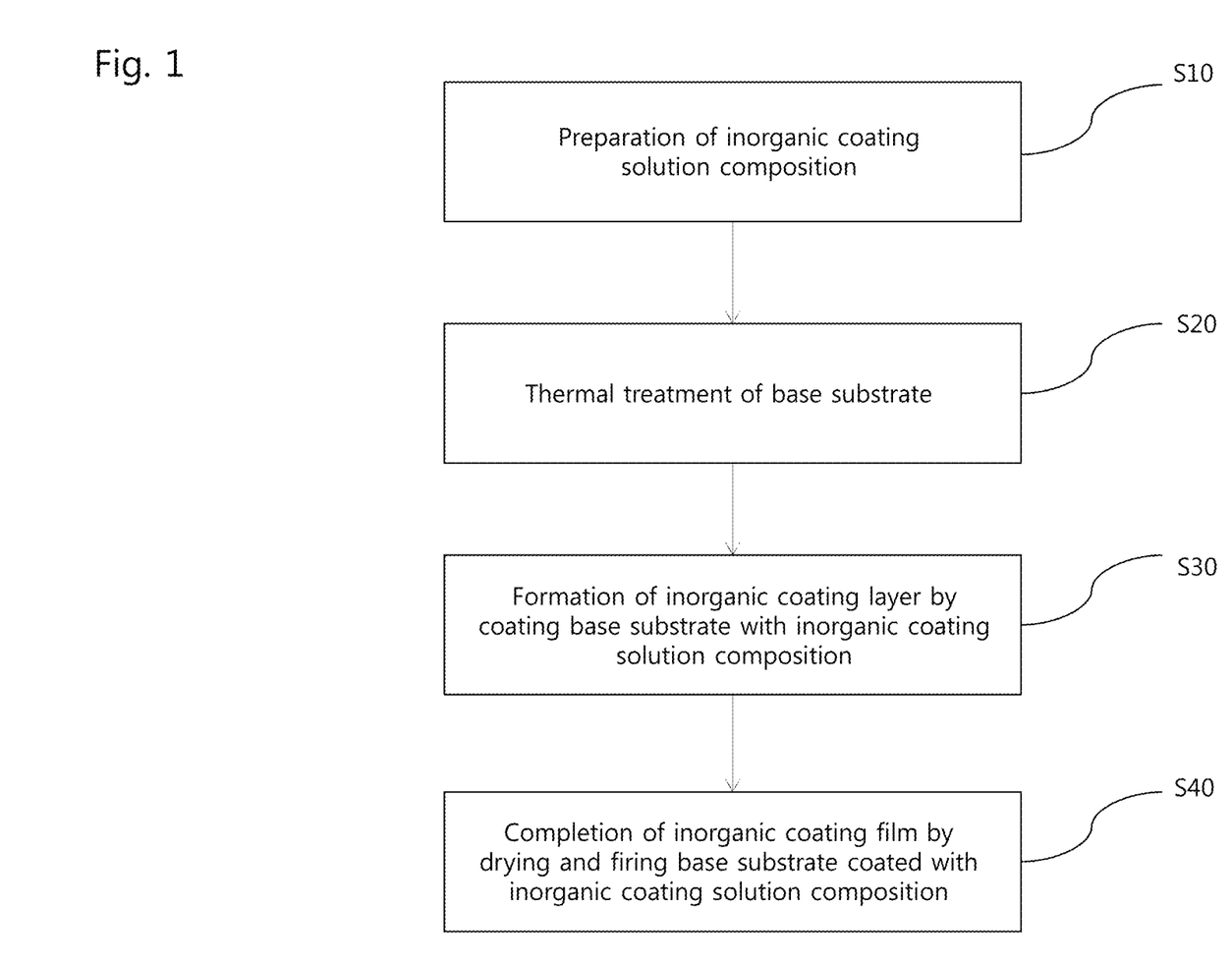
FIG. 1 is a flowchart illustrating the process of forming an inorganic coating film on a base substrate using an inorganic coating solution composition according to an embodiment disclosed herein.

The method of coating the base substrate with the inorganic coating solution composition according to the present embodiment is the same as in the above description with reference to FIG. 1, and a detailed description thereof is omitted.

In still another embodiment of the present disclosure, the inorganic coating solution composition further includes an inorganic filler, in addition to the alkali metal silicate, the curing agent, at least one dispersant, at least one defoamer, the pH controller and the thickener. In the present embodiment, the solvent, especially a hydrophilic solvent such as water, is used.

The inorganic filler may be at least one selected from among titanium dioxide ($TiO_2$), zeolite, silica, and alumna.

The inorganic filler is effective at enhancing the corrosion resistance and durability of the coating surface after the coating process.

In the present embodiment, the inorganic filler may be contained in an amount of 0.01 to 2 parts by weight based on the total weight of the inorganic coating solution composition.

The method of coating the base substrate with the inorganic coating solution composition according to the present embodiment is the same as in the above description with reference to FIG. 1, and a detailed description thereof is omitted.

Although preferred embodiments have been disclosed for illustrative purposes, those skilled in the art will appreciate that various modifications, additions and substitutions are possible, without departing from the scope and spirit of the embodiments in the accompanying claims.

What is claimed is:

1. A method of forming an inorganic coating film, comprising:
preparing an inorganic coating solution composition by mixing an alkali metal silicate, phosphoric acid ($H_2PO_4$), at least one dispersant selected from among Polysorbate 20, Polysorbate 40, Polysorbate 60, Polysorbate 80, polyvinyl pyrrolidone, polyethylene glycol 400 and polyvinyl alcohol, at least one defoamer selected from among a silicone-based defoamer, an alcohol-based defoamer, a mineral oil-based defoamer and a powder defoamer, and a solvent;
thermally treating a base substrate at a first predetermined temperature;
coating a surface of the base substrate, which is thermally treated, with the inorganic coating solution composition; and
firing the base substrate coated with the inorganic coating solution composition at a second predetermined temperature for a predetermined time.

2. The method of claim 1, wherein the solvent is water or a solvent comprising, based on 100 parts by weight of the inorganic coating solution composition, 0.0000005 to 10 parts by weight of a silver colloid, 0.0000001 to 15 parts by weight of titanium dioxide, 0.000001 to 6 parts by weight of a dispersion stabilizer, and 69 to 99 parts by weight of water.

3. The method of claim 1, wherein the preparing the inorganic coating solution composition is performed by preparing the inorganic coating solution composition via further addition of a pH controller and a thickener,
   the pH controller is at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine, and
   the thickener is at least one selected from among polyacrylic acid and carboxymethyl cellulose.

4. The method of claim 1, wherein the preparing the inorganic coating solution composition is performed by preparing the inorganic coating solution composition via further addition of a pH controller for preventing precipitation, a thickener, and an inorganic filler,
   the pH controller is at least one selected from among ammonium hydroxide ($NH_4OH$), tetramethylammonium hydroxide (TMAOH), tetraethylammonium hydroxide (TEAOH), tetrabutylammonium hydroxide (TBAOH), and dimethylethanolamine,
   the thickener is at least one selected from among polyacrylic acid and carboxymethyl cellulose, and
   the inorganic filler is at least one selected from among titanium dioxide ($TiO_2$), zeolite, silica, and alumna.

5. The method of claim 1, further comprising at least one of treating the surface of the base substrate and washing the surface of the base substrate, before the thermally treating the base substrate.

6. The method of claim 1, further comprising drying the base substrate coated with the inorganic coating solution composition at a temperature equal to or higher than room temperature for a predetermined time, before the firing the base substrate.

* * * * *